US010677536B2

(12) United States Patent
Cai et al.

(10) Patent No.: US 10,677,536 B2
(45) Date of Patent: Jun. 9, 2020

(54) OSMOTIC TRANSPORT SYSTEM FOR EVAPORATIVE COOLING

(71) Applicant: TELEDYNE SCIENTIFIC & IMAGING, LLC., Thousand Oaks, CA (US)

(72) Inventors: Steve Qingjun Cai, Newbury Park, CA (US); Avijit Bhunia, Newbury Park, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 0 days.

(21) Appl. No.: 15/367,728

(22) Filed: Dec. 2, 2016

(65) Prior Publication Data

US 2017/0234624 A1    Aug. 17, 2017

Related U.S. Application Data

(60) Provisional application No. 62/263,114, filed on Dec. 4, 2015.

(51) Int. Cl.
| | |
|---|---|
| *F28D 15/04* | (2006.01) |
| *F28D 15/02* | (2006.01) |
| *B01D 53/34* | (2006.01) |

(52) U.S. Cl.
CPC .......... *F28D 15/046* (2013.01); *F28D 15/02* (2013.01); *F28D 15/0258* (2013.01);
(Continued)

(58) Field of Classification Search
CPC ...... F28D 15/02; F28D 15/0258; F28D 15/04; F28D 15/046; B01D 53/343; B01D 2259/655; B01D 2259/657
(Continued)

(56) References Cited

U.S. PATENT DOCUMENTS

| 2,506,984 A | | 5/1950 | Anderson | |
|---|---|---|---|---|
| 3,561,525 A | * | 2/1971 | Baer ..................... | F28D 15/025 165/104.22 |

(Continued)

FOREIGN PATENT DOCUMENTS

| CA | 2334628 A1 | * | 12/1999 | ............. | B01B 1/005 |
|---|---|---|---|---|---|
| GB | 2127143 A | * | 4/1984 | ............. | F28D 15/04 |

(Continued)

OTHER PUBLICATIONS

Thermal Degradation—Schniewind (1989).*

(Continued)

*Primary Examiner* — Len Tran
*Assistant Examiner* — Jenna M Hopkins
(74) *Attorney, Agent, or Firm* — K&L Gates LLP

(57) ABSTRACT

An osmotic transport apparatus includes a heat conducting chamber having an inner wall, a heat absorption end and a heat dissipation end, an osmotic membrane extending substantially longitudinally along an inner wall of the heat conducting chamber from the heat absorption end to the heat dissipation end, a liquid salt solution disposed in the osmotic membrane, and an inner vapor cavity so that when heat is applied to the heat absorption end, vapor is expelled from the osmotic membrane at the heat absorption end, is condensed on the osmotic membrane at the heat dissipation end, and is drawn into the osmotic membrane at the heat dissipation end for passive pumping transport back to the heat absorption end as more condensate is drawn through the osmotic membrane.

20 Claims, 4 Drawing Sheets

(52) U.S. Cl.
CPC ............ *F28D 15/04* (2013.01); *B01D 53/343* (2013.01); *B01D 2259/655* (2013.01); *B01D 2259/657* (2013.01)

(58) Field of Classification Search
USPC .......................... 165/104.22, 104.26, 104.21
See application file for complete search history.

(56) References Cited

U.S. PATENT DOCUMENTS

| | | | | |
|---|---|---|---|---|
| 3,563,309 | A * | 2/1971 | Basiulis | F28D 15/06 165/104.26 |
| 3,677,337 | A * | 7/1972 | Midolo | F28D 15/025 165/104.22 |
| 3,682,239 | A * | 8/1972 | Abu-Romia | F28D 15/025 165/104.26 |
| 3,741,289 | A * | 6/1973 | Moore | F28D 15/04 165/104.24 |
| 3,779,310 | A * | 12/1973 | Russell | F28D 15/046 122/33 |
| 3,786,861 | A * | 1/1974 | Eggers | F28D 15/046 165/104.26 |
| 3,990,502 | A * | 11/1976 | Best | E21B 36/00 165/45 |
| 4,043,387 | A * | 8/1977 | Lamp | F28D 15/0258 165/104.26 |
| 4,135,371 | A * | 1/1979 | Kesselring | F28D 20/003 62/477 |
| 4,300,624 | A * | 11/1981 | Minning | F25B 15/14 165/104.22 |
| 4,331,200 | A * | 5/1982 | Basiulis | F25B 15/14 165/104.22 |
| 4,365,664 | A * | 12/1982 | Basiulis | B01D 63/10 165/104.22 |
| 4,422,501 | A * | 12/1983 | Franklin | F28D 15/04 165/104.23 |
| 4,441,548 | A * | 4/1984 | Franklin | F28D 15/046 165/104.26 |
| 4,470,451 | A * | 9/1984 | Alario | F28D 15/0233 122/366 |
| 4,807,697 | A * | 2/1989 | Gernert | F28D 15/0233 122/366 |
| 4,854,379 | A * | 8/1989 | Shaubach | F28D 15/04 165/104.26 |
| 4,862,708 | A * | 9/1989 | Basiulis | F25B 15/14 165/104.22 |
| 4,890,668 | A * | 1/1990 | Cima | F28D 15/043 165/104.25 |
| 4,934,160 | A * | 6/1990 | Mueller | B64G 1/50 122/366 |
| 5,358,799 | A * | 10/1994 | Gardner | H01M 8/04029 165/104.26 |
| 5,685,289 | A * | 11/1997 | Yogev | F28D 20/025 126/400 |
| 6,220,338 | B1 | 4/2001 | Grandi | |
| 6,351,951 | B1 * | 3/2002 | Guo | F25B 21/02 62/3.2 |
| 6,438,992 | B1 | 8/2002 | Smith et al. | |
| 6,446,706 | B1 * | 9/2002 | Rosenfeld | F28D 15/0241 165/104.26 |
| 6,474,100 | B1 * | 11/2002 | Smith | F25B 17/08 62/101 |
| 6,533,781 | B2 | 3/2003 | Heim et al. | |
| 7,043,935 | B2 | 5/2006 | Hunter | |
| 7,137,442 | B2 * | 11/2006 | Kawahara | F28D 15/0233 165/104.26 |
| 7,265,979 | B2 * | 9/2007 | Erturk | H01L 23/427 257/713 |
| 7,875,066 | B2 | 1/2011 | Cohen et al. | |
| 8,109,325 | B2 * | 2/2012 | Kroliczek | F28D 15/043 165/104.21 |
| 9,157,659 | B2 | 10/2015 | Lowenstein | |
| 9,593,866 | B2 | 3/2017 | Baldwin | |
| 9,651,311 | B2 | 5/2017 | Hsieh et al. | |
| 9,693,484 | B2 | 6/2017 | Shelnutt et al. | |
| 9,804,607 | B1 | 10/2017 | Coleman | |
| 10,271,458 | B2 * | 4/2019 | Asai | H05K 7/20327 |
| 2003/0062149 | A1 * | 4/2003 | Goodson | F04B 19/006 165/104.11 |
| 2005/0286227 | A1 * | 12/2005 | Erturk | H01L 23/427 361/702 |
| 2006/0039113 | A1 * | 2/2006 | Cheng | B01D 46/40 361/700 |
| 2007/0144716 | A1 * | 6/2007 | Doh | B01D 63/02 165/158 |
| 2008/0283221 | A1 * | 11/2008 | Terp | F28C 3/06 165/104.22 |
| 2009/0020269 | A1 * | 1/2009 | Chang | F28D 15/046 165/104.26 |
| 2010/0254090 | A1 * | 10/2010 | Trautman | F28D 15/046 361/704 |
| 2011/0146956 | A1 * | 6/2011 | Stroock | F28D 15/046 165/104.26 |
| 2012/0241122 | A1 * | 9/2012 | Xiang | C09K 5/063 165/10 |
| 2013/0011332 | A1 * | 1/2013 | Boyden | A61M 37/0015 424/1.11 |
| 2013/0312939 | A1 * | 11/2013 | Uchida | F28D 15/04 165/104.26 |
| 2014/0197355 | A1 * | 7/2014 | Ram | C08G 73/1035 252/75 |
| 2015/0140367 | A1 | 5/2015 | Yagi et al. | |
| 2017/0141724 | A1 | 5/2017 | O'Donnell et al. | |
| 2017/0229375 | A1 * | 8/2017 | Haj-Hariri | H01L 23/427 |
| 2018/0051937 | A1 * | 2/2018 | Thiers | C02F 1/441 |
| 2018/0135880 | A1 | 5/2018 | Moghaddam et al. | |
| 2018/0142958 | A1 * | 5/2018 | Hanganu | B01D 47/05 |

FOREIGN PATENT DOCUMENTS

| | | | | |
|---|---|---|---|---|
| JP | 57047189 A * | 3/1982 | ............ | F28D 15/02 |
| JP | 57047190 A * | 3/1982 | ............ | F28D 15/02 |
| JP | 2004077051 A * | 3/2004 | ............ | B01B 1/005 |
| KR | 20040017211 A * | 2/2004 | ............ | B01B 1/005 |
| WO | WO-2016047098 A1 * | 3/2016 | ............ | F25B 41/00 |

OTHER PUBLICATIONS

Heat Pipes—Review, Opportunities and Challenges—Faghri (2014).*
Membranes—University of Mississippi (Nov. 2014) (Year: 2014).*
WO-9964147-A2 (Year: 1999).*
Doshi and Eastman,"Osmotic Heat Pipe: Problems and Promises", Letters and Heat and Mass Transfer, vol. 4, pp. 429-436, 1977, Pergamon Press, Great Britain.
Ippohshi and Imura, "Study of Heat Transport of an Osmotic Heat Pipe: part 1. Effects of the Initial Concentration on Heat Transport Limits", Heat Transfer Asian Research 29, 2000.
Ippohshi and Imura, "Study of Heat Transport of an Osmotic Heat Pipe: Part 2 Flow in the Membrane Module", Heat Transfer Asian Research 29 (4), 2000.
Ippohshi et al. "Fundamental Study on an Osmotic Heat Pipe with a Two-Phase Solution Loop",Heat pipe Science and Technology, Proceedings of the 11th Int. Heat Pipe Conference, Tokyo-Japan, 1999, pp. 414-419.
Kazadi et al. "A Membrane-Enabled Solar Heat Pipe for Solar Thermal Water Heating", The 2nd International Symposium On Environment Friendly Energies And Applications, IEEE, 2012, pp. 173-178.

* cited by examiner

OSMOTIC TRANSPORT SYSTEM FOR EVAPORATIVE COOLING

CROSS-REFERENCE TO RELATED APPLICATIONS

This application claims priority to and benefit of U.S. Provisional Application No. 62/263,114 filed Dec. 4, 2015 which is hereby incorporated by reference for all purposes.

BACKGROUND

Field of the Invention

The field of the invention relates to heat sinks, and more particularly to heat pipes for use in aviation and aerospace.

Description of the Related Art

Passive heat transfer systems are not typically used in today's aeronautic platforms due to hydrostatic pressure requirements for such systems. For example, heat pipes using an internal wick structure for return of a working fluid from an evaporator end to a condenser end, such as that illustrated in FIG. 1, may suffer from a high hydrostatic pressure drop when subjected to the high gravity (g) forces that may be experienced by such heat pipes when used in aircraft or aerospace vehicles. The g forces may significantly increase flow resistance for liquid returning to the evaporator (see also FIG. 2) to a point where capillary pumping pressure may not be sufficient to maintain adequate flow of the working fluid. Phase change heat transfer performance is significantly weakened by the poor working liquid supply, thereby motivating designers of heat transfer systems to use alternative technologies. In general, it is estimated that no practical heat pipe system using vapor-chamber technology may work against gravity up to 9g. Although unfavorable, liquid cooling or unreliable fan cooling systems become the only choices for aeronautic thermal solution. Liquid cooling approaches use a pump to circulate WEG liquid between the hot sources and heat sink. Unfortunately, the weight of WEG liquid, along with the electrical pump, sacrifices the airplane payload and electrical energy consumption. Fan cooling approaches are notorious for their low heat transfer effectiveness. In general, the heat transfer coefficient of forced air convection is one order of magnitude lower than liquid convection or phase change heat transfer. Fan cooling is also an unreliable thermal management approach, proven by numerous cases in the electronic industry.

Thus, there is a critical need to provide evaporative cooling of a heat source such as power electronics in a high-gravity (g) environment without consuming excess electrical power and without introducing unnecessary weight.

SUMMARY

An osmotic transport apparatus includes a heat conducting chamber having an inner wall, a heat absorption end and a heat dissipation end, an osmotic membrane extending substantially longitudinally along an inner wall of the heat conducting chamber from the heat absorption end to the heat dissipation end, a liquid salt solution enclosed in the osmotic membrane, and an inner vapor cavity so that when heat is applied to the heat absorption end, vapor is expelled from the osmotic membrane at the heat absorption end, is condensed on the osmotic membrane at the heat dissipation end, and is drawn into the osmotic membrane at the heat dissipation end for passive pumping transport back to the heat absorption end as more condensate is drawn through the osmotic membrane. The apparatus may also include a heat conductive mesh disposed against and restraining axial movement of the osmotic membrane. The osmotic membrane may be a first closed osmotic membrane tube. A second closed osmotic membrane tube may extend substantially longitudinally within the heat conducting chamber from the heat absorption end to the heat dissipation end. A plurality of heat-conductive fibers may be interspersed between the first and second osmotic membrane tubes. The salt solution may be selected from the group consisting of NaCl and $Na_2SO_4$, and the salt solution may have a concentration of 0.1-1.5 mol. In embodiments, the osmotic membrane may have a circular cross section. In other embodiments, the osmotic membrane may have an annular cross section.

An osmotic transport cooling method may include accepting heat into a liquid salt solution disposed in respective interiors of a plurality of osmotic membranes at a heat absorption end of a heat conducting chamber, expelling vapor from the respective interiors in response to the introducing of heat into the liquid salt solution to form a concentrated liquid salt solution, transporting the expelled vapor through an inner vapor cavity disposed longitudinally within the heat conducting chamber to a heat dissipation end of the heat conducting chamber, accepting condensate into the respective interiors of the plurality of osmotic membranes at the heat dissipation end in response to osmotic pumping of the condensate through respective walls of the respective plurality of osmotic membranes into the liquid salt solution to form a diluted liquid salt solution, and transporting the diluted liquid salt solution back to the heat absorption end in response to osmotic pumping action resulting from accepting the condensate into the respective interiors at the heat dissipation end. The method may also include radially restraining the osmotic membranes using a rigid and heat conducting mesh. The plurality of osmotic membranes may include a plurality of tubular osmotic membranes. In embodiments, the method may include accepting excess heat through an outer wall of the heat conducting chamber into a heat sink. Accepting heat into the liquid salt solution disposed in respective interiors of a plurality of osmotic membranes at a heat absorption end further may also include transporting heat from an interior surface of the heat conducting chamber, through a plurality of metallic fibers and into the respective interiors of the plurality of osmotic membranes. The diluted salt solution may include a salt solution selected from the group consisting of NaCl and $Na_2SO_4$. The salt solution may have a concentration of 0.1-1.5 mol.

An osmotic transport apparatus may include a cylindrical heat conducting chamber, a plurality of closed osmotic membranes extending from a first end to a second end of the heat conducting chamber, and an inner vapor cavity extending from the first end to the second end. Each of the plurality of closed osmotic membranes may have a cross section selected from the group consisting of: circular and annular. A heat source may also be included that faces an exterior wall of the heat conducting chamber at the first end. The apparatus may also include vapor disposed adjacent the plurality of closed osmotic membranes at the first end and condensate on the plurality of closed osmotic membranes at the second end.

BRIEF DESCRIPTION OF THE DRAWINGS

The components in the figures are not necessarily to scale, emphasis instead being placed upon illustrating the principals of the invention. Like reference numerals designate corresponding parts throughout the different views.

DETAILED DESCRIPTION

The inventive system described herein is able to constantly transfer liquid and heat in high-gravity (g) environment without consuming electrical power, benefitting from its exceptional osmotic transport mechanism. This invention is able to create a new, light-weight and highly efficient heat transfer system and technology, satisfying the needs of the aeronautic industry. In one example, the estimated heat carrying capability may be 3,500 W over a maximum heat transfer distance of 10 m under 10 g gravitational force.

Figure 1:
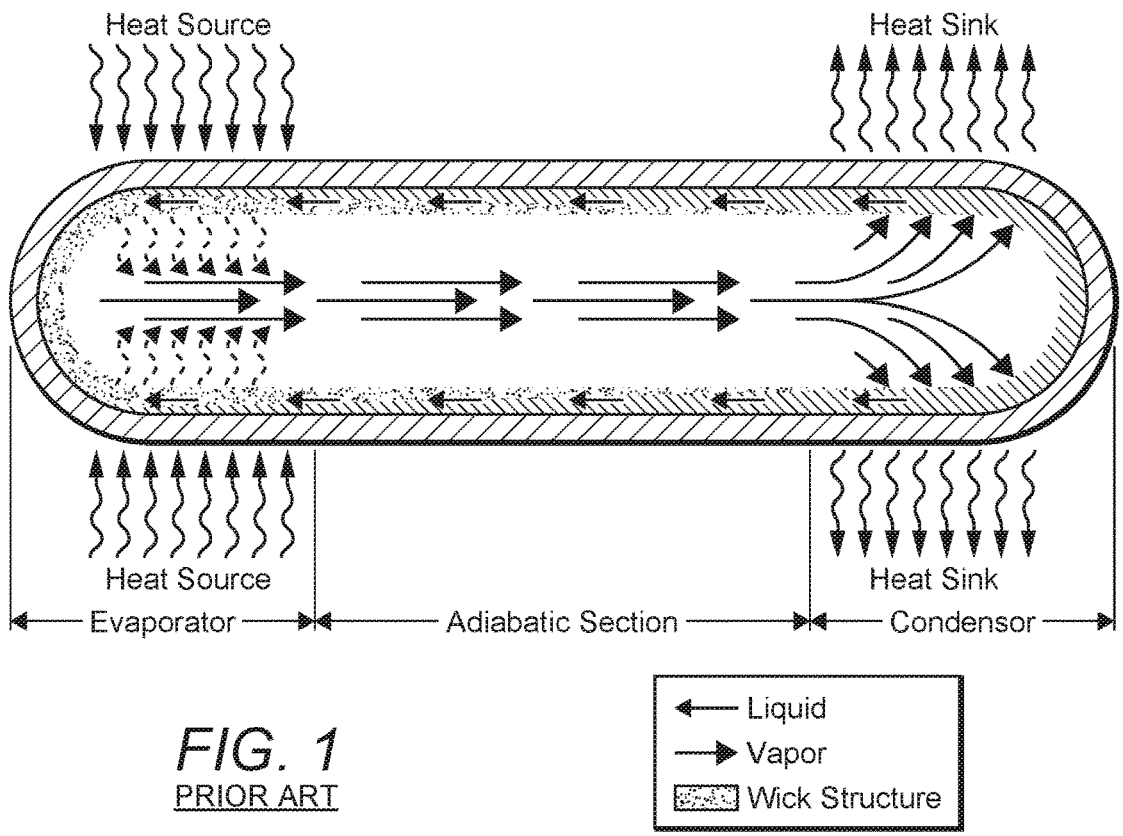
FIG. 1 is a cross section view of a prior art heat pipe.
Figure 2:
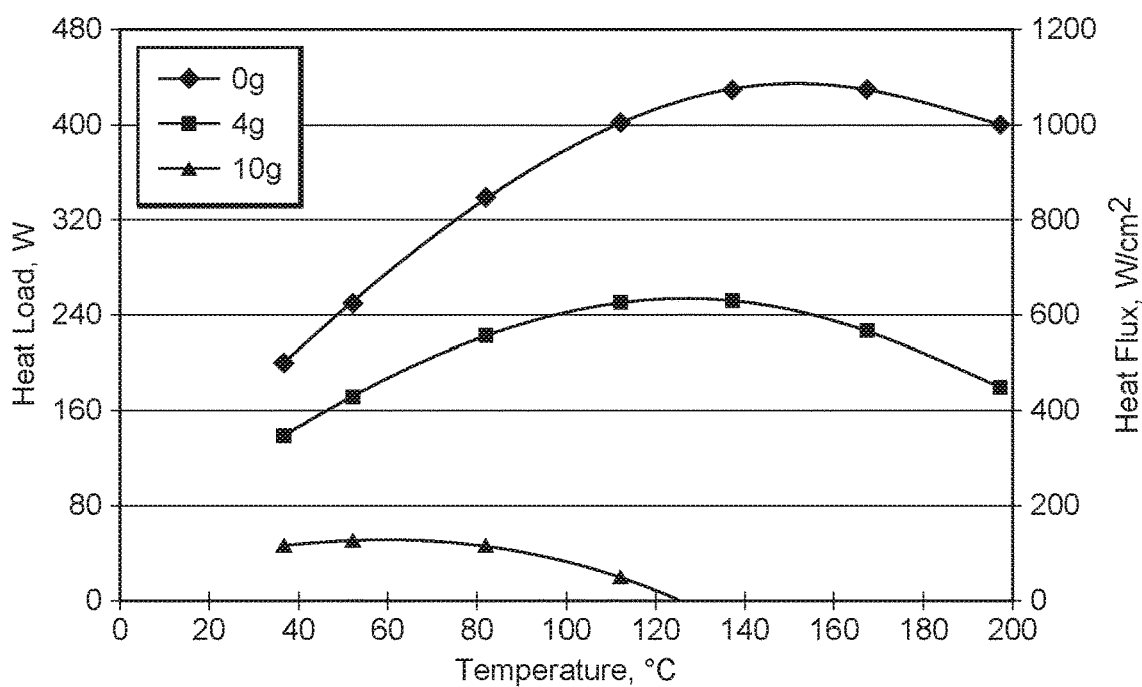
FIG. 2 is a graph illustrating head load (W) versus temperature for a heat pipe experiencing different heat gravity forces.
Figure 3:
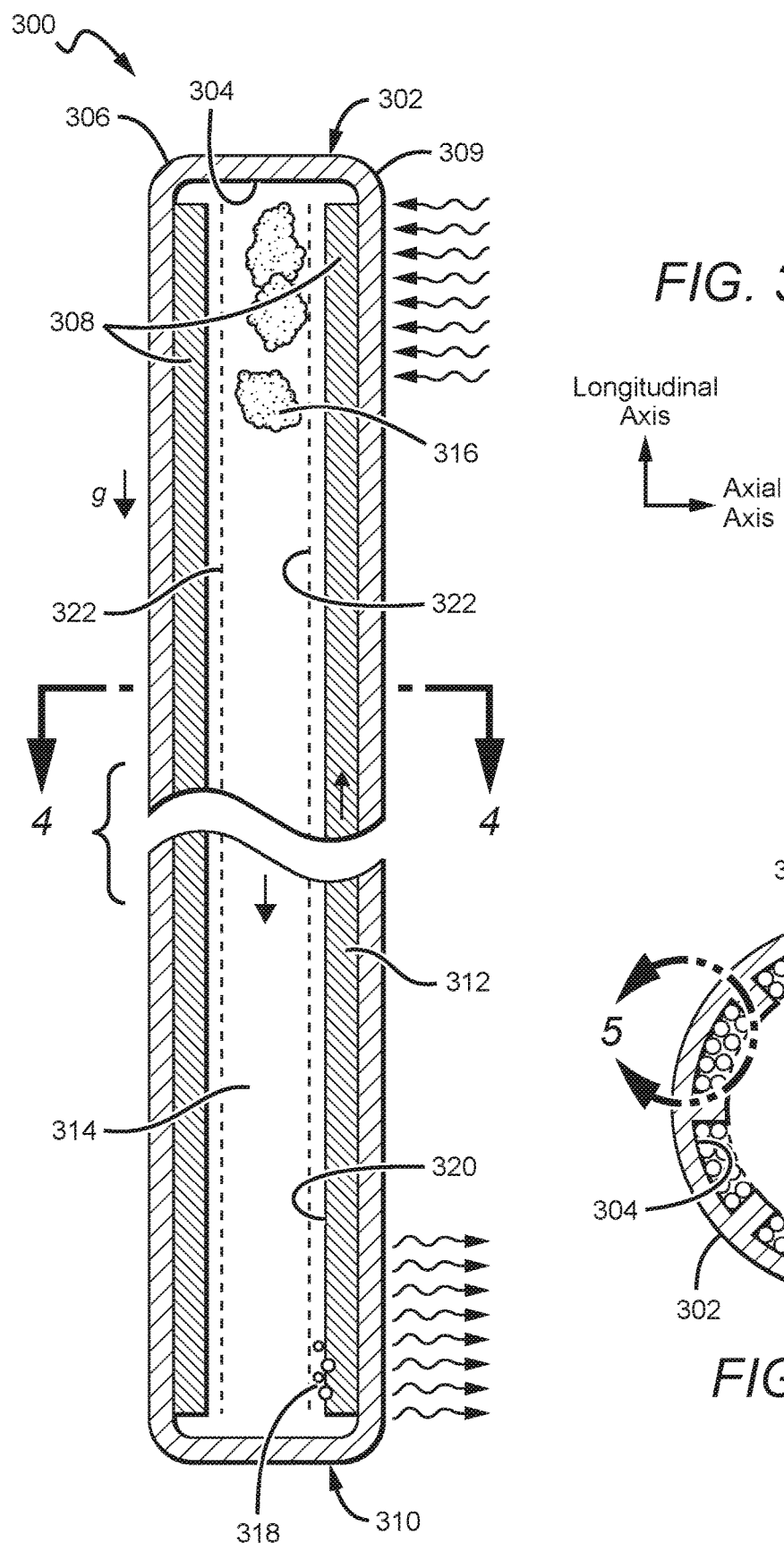
FIG. 3 is a cross section of one embodiment of an osmotic transport system having a single osmotic membrane extending from a heat absorption end to a heat dissipation end.

FIG. 3 illustrates one embodiment of an osmotic transport system 300 that may be used as a heat sink for evaporative cooling of a heat source such as power electronics. A heat conducting chamber 302 may have inner and exterior surfaces (304, 306) (alternatively referred to as inner and outer walls) that are formed of a heat conductive material such as stainless steel, copper (Cu), aluminum (Al) or other metallic material, or of a heat conducting composite material such as graphite, to enable heat transfer between the inner and exterior surfaces (304, 306). As illustrated in cross section, the heat conducting chamber 300 is preferable cylindrical and having a circular cross-section, but may form other elongated shapes such as a cylinder having an oval or polygonal cross-section or cross sections that vary longitudinally.

An osmotic membrane 308 may extend circumferentially and substantially longitudinally along the inner wall 304 of the heat conducting chamber from a heat absorption end 309 to a heat dissipation end 310. As described herein, the heat absorption end 309 is generally the end of the osmotic transport system 300 that accepts excess heat (indicated with arrows) from the heat source (not shown) such as power electronics. The heat dissipation end 310 may be used to accept excess heat. Each end of the osmotic membrane 308 is closed (i.e., a "closed osmotic membrane") to enclose a liquid salt solution 312. An inner vapor cavity 314 is established by the osmotic membrane 308 as it extends circumferentially about the inner surface 304 of the heat conducting chamber 302 for transporting vapor 316. The membrane material has an inner surface 320 and serves to separate the salt solution from the vapor and solvent condensate 318. The system 300 may also include a heat conductive mesh 322 disposed against and restraining radial movement of the plurality of osmotic membranes 308. The heat conductive mesh 322 may prevent large deformation of the membrane when under internal pressure during operation. For example, if nucleate boiling is accidentally triggered inside the osmotic membrane 308, the heat conductive mesh 322 would constrain the expansion tendency of the osmotic membrane 308.

When operating against gravity, the heat absorption end (the evaporator) 309 of the heat conducting chamber 302 absorbs heat (indicated by arrows). The absorbed heat serves to evaporate a portion of solvent of the salt solution 312 in the osmotic membrane 308 to create vapor. The vapor passes through the semi-permeable membrane of the osmotic membrane 308 and into the inner vapor cavity 314. Driven by a saturation pressure difference, the vapor 316 flows down to the heat dissipation end 310 which functions as a lower condenser for condensing the vapor 316 into solvent condensate 318. Such condensing of the vapor may also induce solvent vapor flow downward with a vacuum effect on the evaporator side. After releasing latent heat as the condensate is formed, the solvent condensate 318 is sucked into an interior of the osmotic membrane 308 under osmotic pressure and into the solution 312. In response to the passive and forceful entrance into the osmotic membrane 308, the chamber having only a limited ability to expand under such pressures, liquid is transported against the high hydrostatic pressure back to the evaporator section (heat absorption end 309). Because of its symmetrical structure of the osmotic transport system 300, multiple heat or cooling sources may be applied to the exterior surface 306 while maintaining the systems ability to overcome high hydrostatic pressure for liquid transport between heat absorption and heat dissipation regions. In addition, vapor flow may automatically balance the saturation pressure and temperature, providing a uniform temperature distribution along the osmotic transport system 300.

In one embodiment, the salt solution may be Sodium Sulfate ($Na_2SO_4$). Solution concentration may vary between 0.1 to 1.5 mol.

Figure 4:
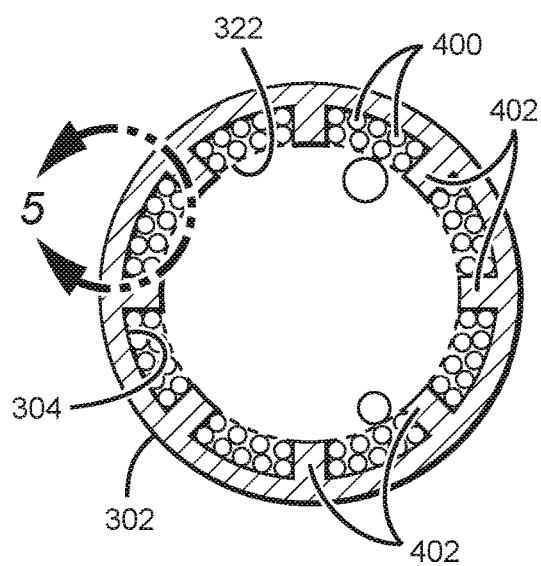
FIG. 4 is a cross section view of FIG. 3 along the lines 4-4.

FIG. 4 illustrates another embodiment of the system 300 viewed along the lines 4-4, in which the osmotic membrane 308 is replaced with a plurality of osmotic membrane tubes 400 grouped adjacent the inner wall 304 and each extending, like the osmotic membrane 308, from a heat absorption end 309 to a heat dissipation end 310 (see FIG. 3). The osmotic membrane tubes 400 may also be bundled between pairs of tube restraining walls 402 extending from the inner walls 304 to better restrain the osmotic membrane tubes 400 from circumferential movement and from undesireable radial expansion during operation. The osmotic membrane tubes 400 are restrained within the osmotic membranes 308 by the thermally conductive mesh 322. The mesh 322 may allow vapor to escape from the osmotic membrane tubes 400 at the heat absorbtion end 309. The mesh 322 may also serve to restrain the osmotic membrane tubes 400 from collectively expanding axially as a result of condensate being drawn into the osmotic membrane tubes 400 as a result of osmotic action at the heat dissipation end 310 (see FIG. 3). The thermally conductive mesh 322 may be formed of copper, stainless steel, rigid polymer or of another material that may be suitable to restrain the osmotic membrane tubes 400 in position and that may resist expansion of the osmotic membrane tubes 400 during operation.

Figure 5:
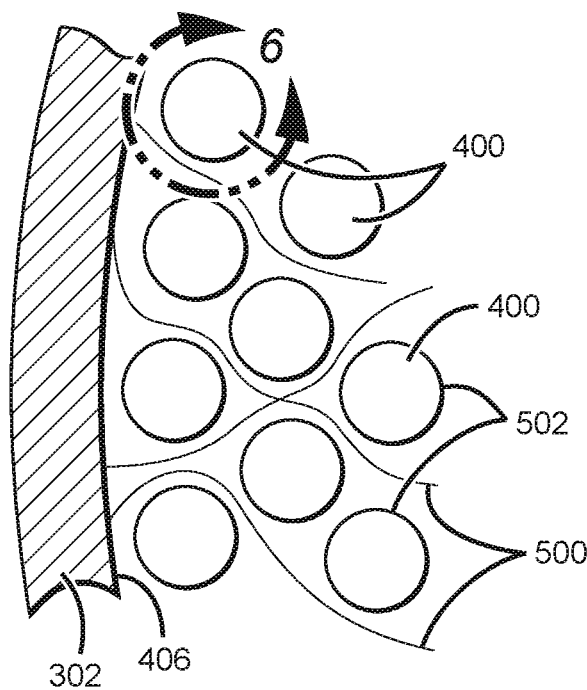
FIG. 5 is a partial cross sectional view of the osmotic membrane tubes 400 and a portion of the chamber illustrated in FIG. 4.

FIG. 5 is a partial cross sectional view of the osmotic membrane tubes 400 and a portion of the chamber illustrated in FIG. 4. Heat conductive fibers, such as copper fibers 500, are illustrated extending from the inner surface 406 of the chamber 302 and interspersed between adjacent osmotic membrane tubes 400. Each copper fiber 500 may be disposed in thermal communication with a plurality of the osmotic membrane tubes 400, with such thermal communication enhanced by deforming such copper fibers 500 to curve around and among outer surfaces 502 of the osmotic membrane tubes 400. The copper fibers 500 serve to carry heat from the inner surface 406 of the chamber 302 through and among the osmotic membrane tubes 400 to facilitate heat transfer between them. In alternative implementations, the heat conductive fibers may be formed of other metals such as silver, stainless steel, aluminum or gold.

Figure 6:
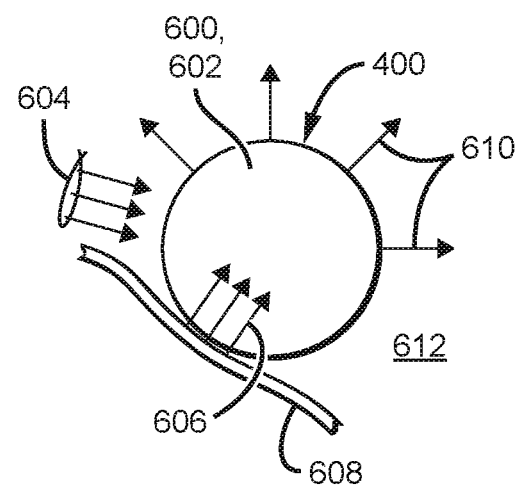
FIG. 6 is a partial cross section view of one of the osmotic membrane tubes 400 illustrated in FIG. 5.

FIG. 6 is a partial cross section view of one of the osmotic membrane tubes 400 illustrated in FIG. 5, with the cross sectional view taken at or near the heat absorption end 309 (see FIG. 3). An interior 600 of the osmotic membrane tube 400 may be charged with a salt solution 602 such as NaCl and or $Na_2SO_4$ solutions. Heat may be received into the interior 600 of the osmotic membrane tube 400 by means of radiative heat 604 received directly from adjacent osmotic membrane tubes or from the inner surface 406 of the chamber 302 (see FIG. 5). Heat may also be received into the interior 600 of the osmotic membrane tube 400 by means of heat 606 received directly from from a heat conductive fiber 608. As the heat 604, 606 is injected into the interior 602 of each membrane tube 400, the salt solution 602 may experience evaporation of a portion of the solvent (preferably water) 610 that is ejected from the interior 600 of the osmotic membrane 400 to its exterior 612.

In one implementation, the osmotic membrane tubes may be organic polymer based, such as the ultrafiltration (UF) family of membranes offered by the GE Power division of GE Corporation in Vista, Calif. With such a membrane material implementation, the salt solution may be Sodium Sulfate ($Na_2SO_4$) having a concentration of approximately between 0.1 to 1.5 mol. In other implementations, such as those using Sodium Chloride, a reverse osmosis (RO) membrane may be used to obtain a desired passive osmotic pumping action. In other embodiments, a nanofiltration (NF) or microfiltration (MF) material may be used, such as found in GE Corporation's spiral wound membranes. For embodiments having membrane tubes, the membranes may be configured having an inner diameter of approximately 1-2 mm. The length of the membrane tubes may correspond to the chosen application, but in one non-limiting example, may extend between 0.3 to 10 m. The inner vapor cavity 314 may have a diameter of approximately 1 to 4 cm.

Figure 7:
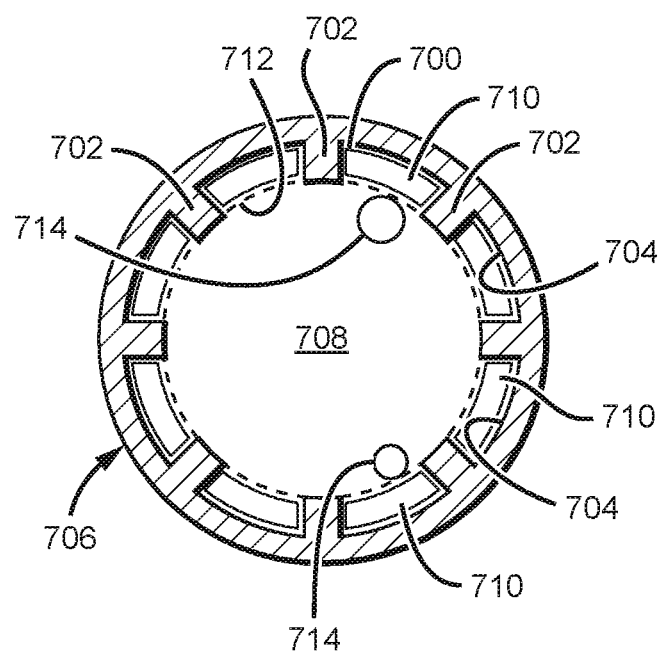
FIG. 7 is a cross-sectional view of one embodiment of a heat conducting chamber that has a single osmotic membrane within each respective osmotic membrane bay.

FIG. 7 illustrates a cross-section of a plurality of osmotic membranes within respective plurality of osmotic membrane bays that are located toward a heat dissipation end 310 (see FIG. 3) of a heat conducting chamber. Osmotic membrane bays 700 are established between adjacent tube restraining walls 702 that extend from an inner surface 704 of the heat conducting chamber 706 towards an inner vapor cavity 708. Disposed in each membrane bay 700 is an osmotic membrane 710 having an annulur cross-section and extending between the heat absorption end 309 and the heat dissipation end 310, with the osmotic membrane 710 filled with a salt solution such as NaCl or $Na_2SO_4$. A tubular metal mesh 712 is disposed circumferentially and abutting each respective membrane 502 to restrain it in the axial direction. Condensate 714 is illustrated as forming on an outer surface of the osmotic membranes 710 prior to being pulled by means of osmotic pumping action into their respective interiors.

Figure 8:
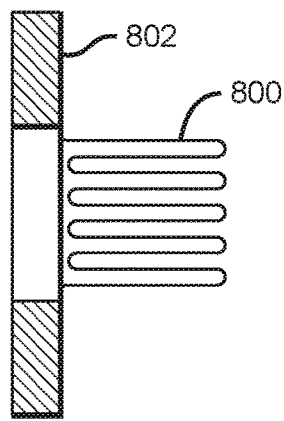
FIG. 8 a cross sectional view illustrating an embodiment osmotic membrane having folds to increase its outer surface area.

FIG. 8 is a cross sectional top view of an alternative embodiment osmotic membrane having folds to increase its outer surface area. The folded osmotic membrane 800 may form a seal with the inner side wall of a heat conducting chamber 802 to establish an inner volume for receipt of a salt solution. Such a folded membrane may be used in lieu of the osmotic membrane 308 used in FIG. 3 to provide for greater evaporative and condensate surface area for greater heat transfer per unit time.

Figure 9:
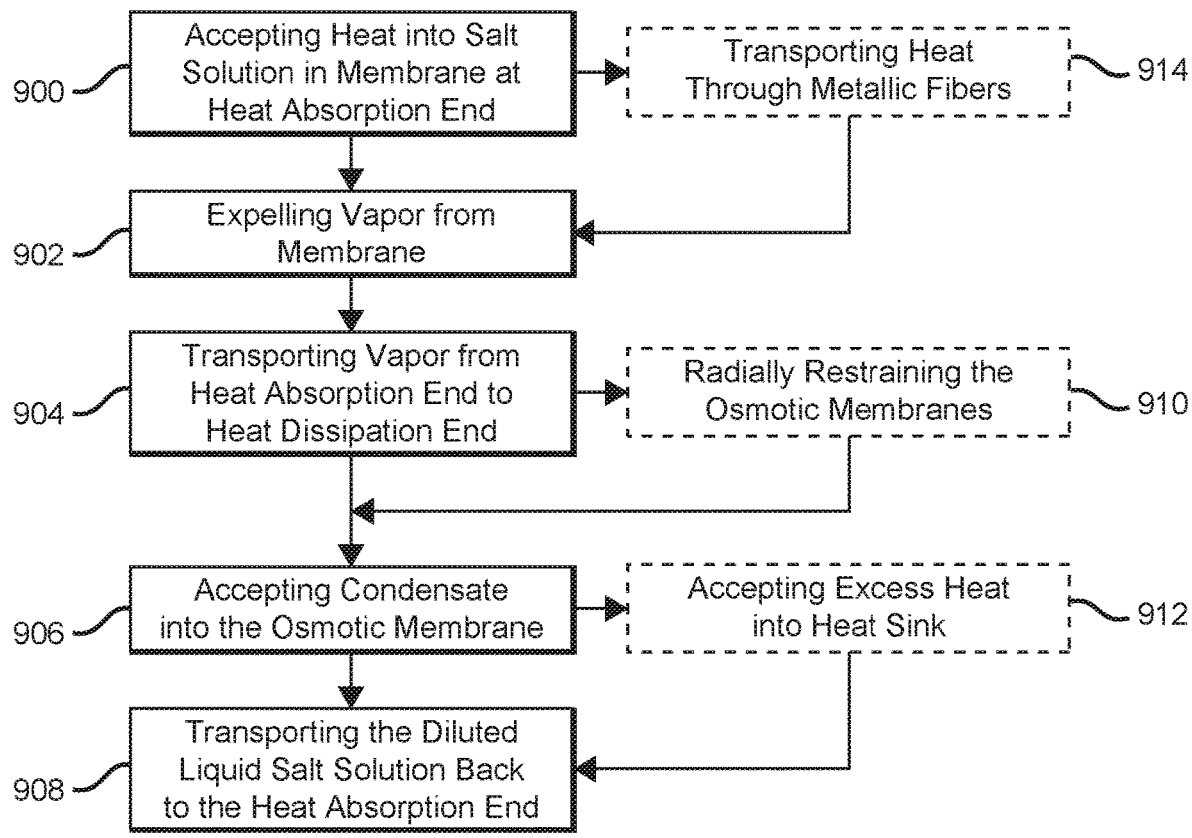
FIG. 9 is a flow diagram illustrating one embodiment of a method of transporting heat from a heat absorption end to a heat dissipation end using osmotic transport.

FIG. 9 is a flow diagram illustrating one embodiment of a method of transporting heat from a heat absorption end to a heat dissipation end using osmotic transport. An osmotic transport cooling method may include accepting heat into a liquid salt solution disposed in respective interiors of a plurality of osmotic membranes at a heat absorption end (see FIG. 3) of a heat conducting chamber (block 900), expelling vapor from the respective interiors in response to the introducing of heat into the salt solution to form a concentrated liquid salt solution (block 902), transporting the expelled vapor through an inner vapor cavity disposed longitudinally within the heat conducting chamber to a heat dissipation end of the heat conducting chamber (block 904), accepting condensate into the respective interiors of the plurality of osmotic membranes at the heat dissipation end in response to osmotic pumping of the condensate through respective walls of the respective plurality of osmotic membranes into the salt solution to form a diluted liquid salt solution (block 906) and transporting the diluted liquid salt solution back to the heat absorption end (block 908) in response to osmotic pumping action resulting from accepting the condensate into the respective interiors at the heat dissipation end. The method may also include axially restraining the osmotic membranes (block 910) using a rigid and heat conducting mesh. In such an embodiment, the plurality of osmotic membranes may include a plurality of tubular osmotic membranes. The method may include accepting excess heat through an outer wall of the heat conducting chamber into a heat sink (block 912). The step of accepting heat into the salt solution disposed in respective interiors of a plurality of osmotic membranes at a heat absorption end further may also include transporting heat from an interior surface of the heat conducting chamber, through a plurality of metallic fibers (block 914) and into the respective interiors of the plurality of osmotic membranes. In some embodiments, the diluted salt solution comprises a salt selected from large molecular soluable groups, including NaCl and $Na_2SO_4$.

While various implementations of the embodiments have been described, it will be apparent to those of ordinary skill in the art that many more embodiments and implementations are possible that are within the scope of this invention.

What is claimed is:

1. An osmotic transport apparatus, comprising:
a heat conducting chamber having an inner wall, a heat absorption end, and a heat dissipation end;
a plurality of closed osmotic membranes, each closed osmotic membrane extending substantially longitudinally along the inner wall of the heat conducting chamber from the heat absorption end to the heat dissipation end, wherein each of the closed osmotic membranes comprises:
an outer membrane surface;
an inner membrane surface defining an interior of each closed osmotic membrane; and a salt solution disposed in the interior of each closed osmotic membrane; and a rigid mesh disposed within the heat conducting chamber and defining an inner vapor cavity extending from the heat absorption end to the heat dissipation end, each of the closed osmotic membranes disposed intermediate the rigid mesh and the inner wall; and wherein when heat is applied to the heat absorption end, a portion of solvent of the salt solution is evaporated to create vapor that is expelled from the interior of at least one of the plurality of closed osmotic membranes at the heat absorption end, and solvent condensate from the vapor is drawn into the interior of the at least one of the plurality of closed osmotic membranes via osmotic pressure at the heat dissipation end.

2. The apparatus of claim 1, wherein the rigid mesh is disposed against at least one outer membrane surface of the plurality of closed osmotic membranes and configured to restrain axial movement of the plurality of closed osmotic membranes as the osmotic pressure causes the passive pumping transport of the salt solution.

3. The apparatus of claim 1, wherein each closed osmotic membrane is a tube.

4. The apparatus of claim 3, wherein the inner wall of the heat conducting chamber is configured to restrain movement of the plurality of closed osmotic membrane when the osmotic pressure causes the passive pumping transport of the salt solution.

5. The apparatus of claim 4, further comprising: a plurality of heat-conductive fibers interspersed between the plurality of closed osmotic membrane.

6. The apparatus of claim 1, wherein the salt solution comprises a salt selected from the group consisting of NaCl and Na2SO4.

7. The apparatus of claim 1, wherein the salt solution has a concentration of 0.1-1.5 mol.

8. The apparatus of claim 1, wherein each of the closed osmotic membranes has a circular cross section or an annular cross section.

9. The apparatus of claim 5, wherein the plurality of heat-conductive fibers extend from the inner wall of the heat conducting chamber and contact at least one of the plurality of closed osmotic membranes.

10. An osmotic transport cooling method, comprising: providing an osmotic transport apparatus, comprising:
a heat conducting chamber having an inner wall, a heat absorption end, and a heat dissipation end;
a plurality of closed osmotic membranes, each closed osmotic membrane extending substantially longitudinally along the inner wall of the heat conducting chamber from the heat absorption end to the heat dissipation end, wherein each of the closed osmotic membranes comprises:
an outer membrane surface;
an inner membrane surface defining an interior of each closed osmotic membrane; and
a salt solution disposed in the interior of each closed osmotic membrane; and
a rigid mesh disposed within the heat conducting chamber and defining an inner vapor cavity extending from the heat absorption end to the heat dissipation end, each of the closed osmotic membranes disposed intermediate the rigid mesh and the inner wall receiving heat into the salt solution disposed in respective interiors of the plurality of closed osmotic membranes at the heat absorption end;

expelling vapor into the inner vapor cavity, the vapor created by evaporating a portion of solvent of the salt solution from the respective interiors of the plurality of closed osmotic membranes, in response to the introducing of the heat into the salt solution to form a concentrated liquid salt solution; and absorbing, solvent condensate from the vapor into the respective interiors of the plurality of osmotic membranes at the heat dissipation end in response to osmotic pumping of the solvent condensate through respective walls of the plurality of osmotic membranes into the salt solution disposed in the respective interiors of the plurality of osmotic membranes to form a diluted salt solution.

11. The method of claim 10, further comprising: radially restraining the plurality of osmotic membranes, with a rigid mesh in physical contact with the second portion of the outer membrane surface of the closed osmotic membrane.

12. The method of claim 10, wherein the plurality of osmotic membranes comprises a plurality of tubular osmotic membranes.

13. The method of claim 10, further comprising: receiving excess heat through an outer wall of the heat conducting chamber from a heat sink.

14. The method of claim 10, wherein receiving heat into the salt solution disposed in the respective interiors of the plurality of closed osmotic membranes at the heat absorption end further comprises:
transporting heat, through a plurality of metallic fibers, from an interior surface of the heat conducting chamber into the respective interiors of the plurality of osmotic membranes.

15. The method of claim 10, wherein the diluted salt solution comprises a salt selected from the group consisting of NaCl and Na2SO4.

16. The method of claim 10, wherein the salt solution has a concentration of 0.1-1.5 mol.

17. An osmotic transport apparatus, comprising:
a heat conducting chamber comprising an inner surface, a first end, and a second end;
a plurality of closed osmotic membranes extending substantially longitudinally between the first end and the second end, wherein each of the closed osmotic membranes comprises:
an outer membrane surface;
an inner membrane surface defining an interior of each closed osmotic membrane; and
a salt solution disposed in the interior of each closed osmotic membrane; and
a rigid mesh disposed within the heat conducting chamber and defining an inner vapor cavity extending between the first end and the second end, each of the closed osmotic membranes disposed intermediate the rigid mesh and the inner wall.

18. The apparatus of claim 17, wherein each of the plurality of closed osmotic membranes have a cross section selected from the group consisting of: circular and annular.

19. The apparatus of claim 1, further comprising a restraining wall extending from the inner wall to the rigid mesh, the restraining wall is configured to form at least two bays, each bay extending from the heat absorption end to the dissipation end, wherein a first portion of the plurality of closed osmotic membranes is disposed within a first bay of the at least two bays and a second portion of the plurality of the closed osmotic membranes is disposed within a second bay of the at least two bays.

20. The apparatus of claim 19, wherein the rigid mesh is in contact with the restraining wall and at least one of the closed osmotic membranes is in contact with the inner wall.

\* \* \* \* \*